United States Patent [19]

Swink et al.

[11] Patent Number: 6,085,825
[45] Date of Patent: Jul. 11, 2000

[54] POWER-DRIVEN SHUTTER ASSEMBLY

[75] Inventors: Edward A. Swink, Drexel; Clayton M. Smith, Blue Springs; Carl L. Murphy, Belton; Rick Lavelock, Pleasant Hill, all of Mo.

[73] Assignee: Rom Corporation, Belton, Mo.

[21] Appl. No.: 09/138,099

[22] Filed: Aug. 21, 1998

[51] Int. Cl.[7] .................................................. E05F 11/00
[52] U.S. Cl. ........................ 160/188; 160/201; 160/133
[58] Field of Search .................................. 160/201, 133, 160/188, 290.1, 310; 49/31; 292/341.16, DIG. 36

[56] References Cited

U.S. PATENT DOCUMENTS

| | | | |
|---|---|---|---|
| 3,490,514 | 1/1970 | Duncan | 160/133 |
| 3,974,723 | 8/1976 | Bowling et al. | 340/274 R |
| 4,232,309 | 11/1980 | Dillitzer | 340/547 |
| 4,254,582 | 3/1981 | Mcgee | 292/DIG. 36 |
| 4,328,451 | 5/1982 | Barge | 49/31 |
| 4,365,660 | 12/1982 | Henkenjohann | 160/133 |
| 4,593,491 | 6/1986 | Carlson et al. | 49/13 |
| 4,694,191 | 9/1987 | Segoshi | 307/10 |
| 4,795,206 | 1/1989 | Adams | 160/201 |
| 4,982,984 | 1/1991 | Yokota et al. . | |
| 4,986,331 | 1/1991 | Henkenjohann | 160/201 |
| 5,040,843 | 8/1991 | Russell et al. | 160/133 |
| 5,076,625 | 12/1991 | Oxley | 292/314.16 |
| 5,121,098 | 6/1992 | Chen | 340/457 |
| 5,135,040 | 8/1992 | Ruiter | 160/201 |
| 5,351,439 | 10/1994 | Takeda et al. | 49/31 |
| 5,355,927 | 10/1994 | Mckeon | 160/133 |
| 5,533,561 | 7/1996 | Forehand, IV | 160/201 |
| 5,540,269 | 7/1996 | Plumer | 160/188 |
| 5,602,526 | 2/1997 | Read | 340/457 |
| 5,704,663 | 1/1998 | Clay, Jr. | 292/DIG. 36 |
| 5,713,621 | 2/1998 | Krenkel et al. | 296/24.1 |
| 5,720,333 | 2/1998 | Turvey | 292/DIG. 36 |

*Primary Examiner*—Blair M. Johnson
*Attorney, Agent, or Firm*—Shook, Hardy & Bacon L.L.P.

[57] ABSTRACT

A power-driven shutter door includes a curtain supported in a pair of tracks for bi-directional sliding movement open and closed positions, and a power drive assembly for driving movement of the curtain. The power drive assembly includes a pair of sprockets that engage shoes of the curtain, a motor for driving bi-directional rotation of the sprockets, and a control circuit including a switch movable between "open" and "close" positions for supplying power to the motor to move the shutter curtain between positions. A power-driven lock is also provided, and includes a rod supported on the curtain for movement between extended and retracted positions, a manually-operated actuator for shifting the rod between the extended and retracted positions, and a power-driven lock supported on one of the tracks and presenting a locking arm shiftable between an extended position in which the arm protrudes into the track and a relatively retracted position. An actuator is connected to the arm for shifting the arm between positions, and a circuit is connected to the actuator and includes a switch that allows control of the actuator. The curtain is locked against sliding movement from the closed position when both the rod and locking arm are extended, but is unlocked for sliding movement the rod or locking arm is retracted.

10 Claims, 4 Drawing Sheets

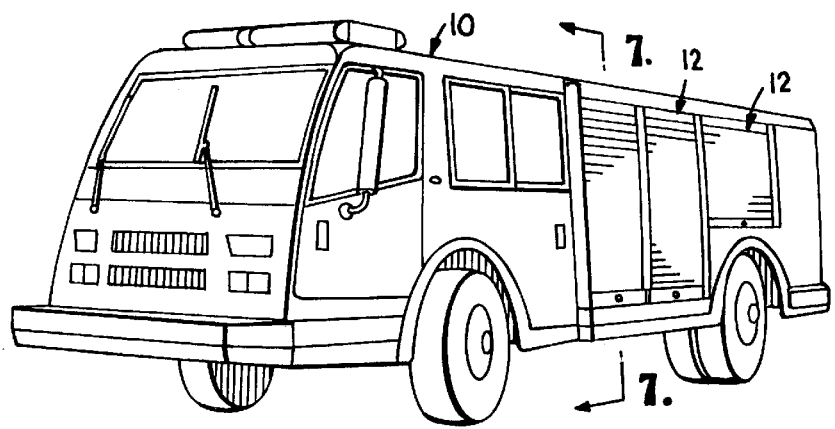
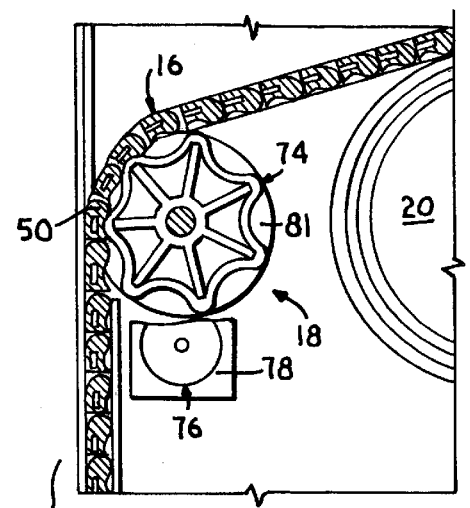
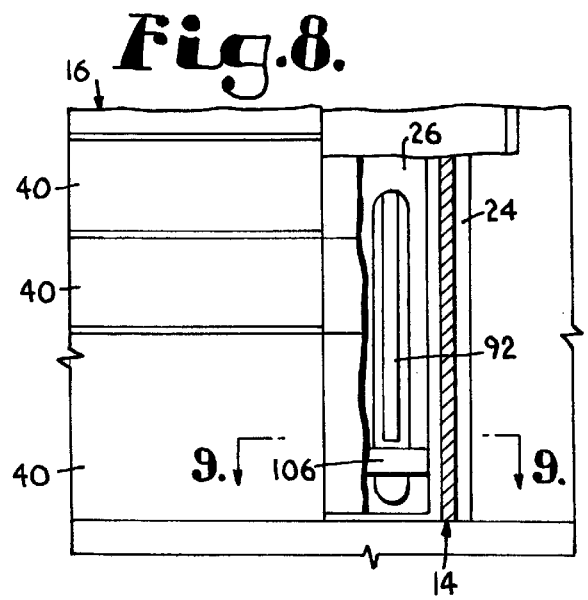
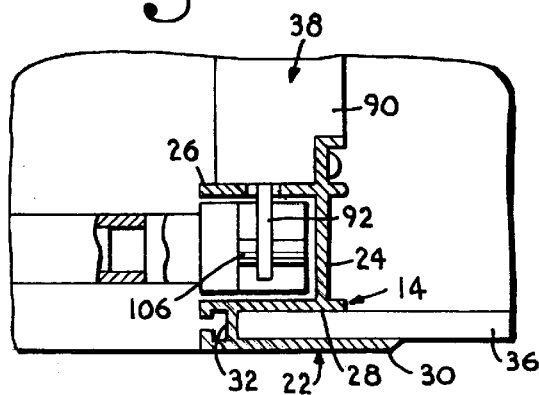
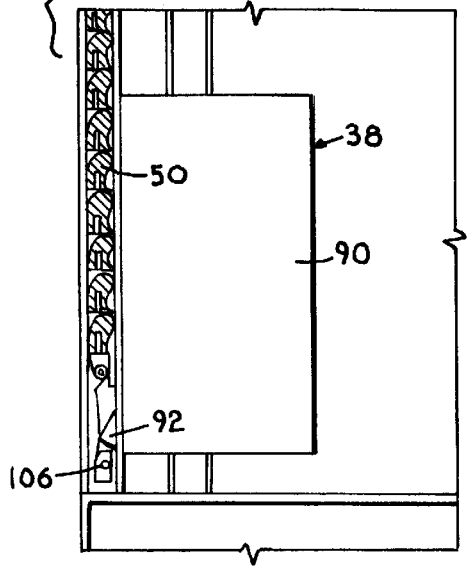

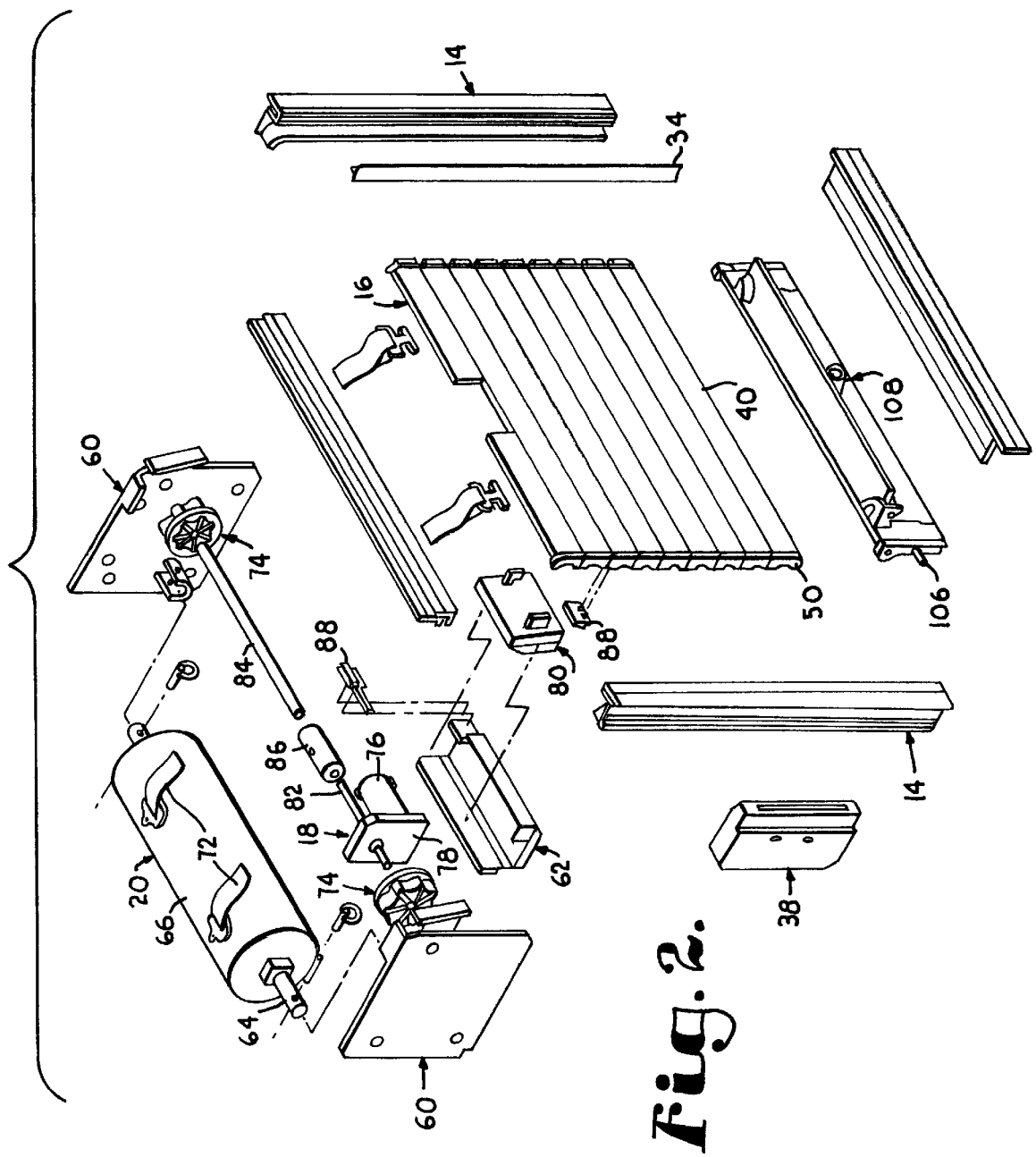

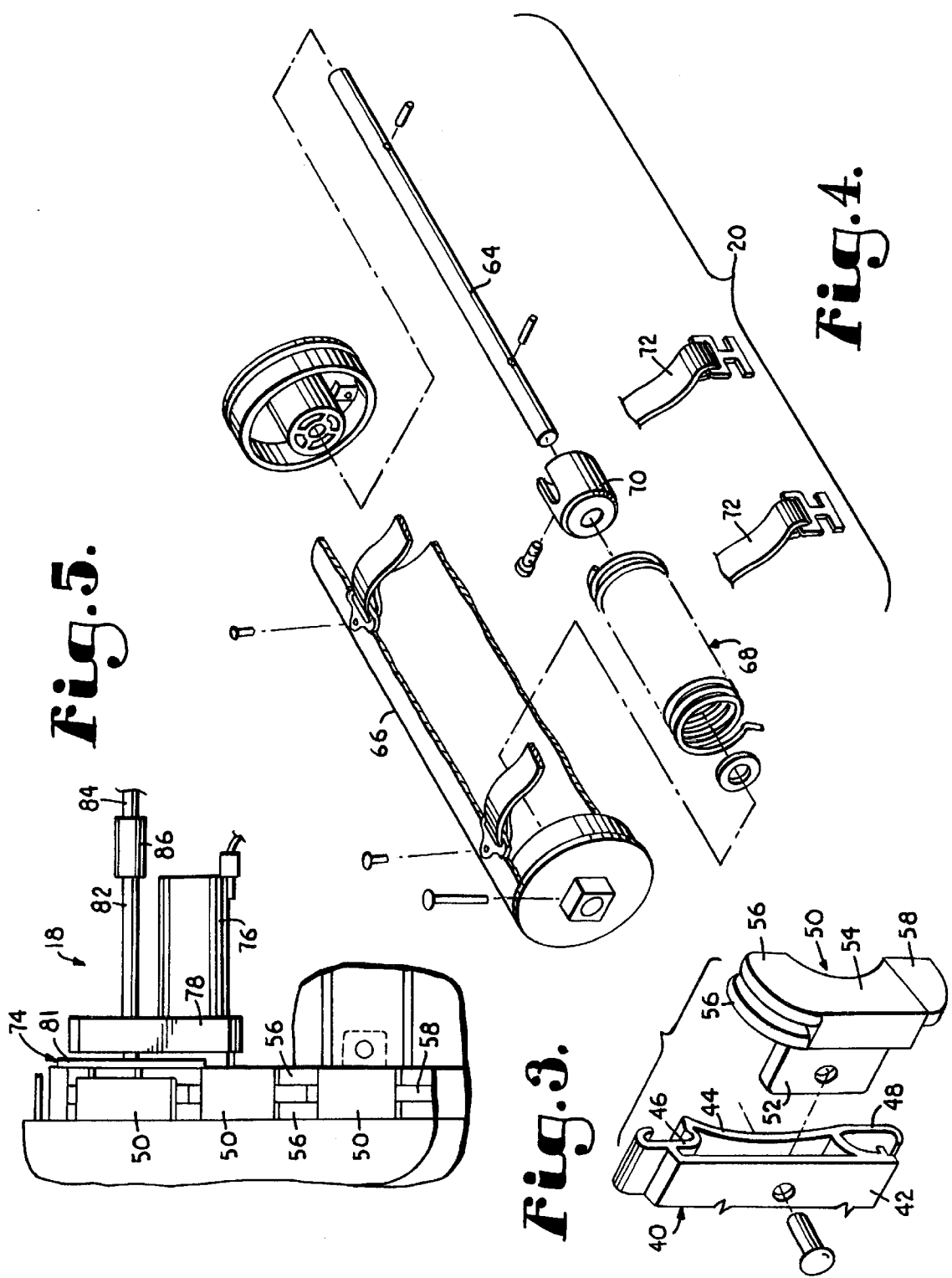

POWER-DRIVEN SHUTTER ASSEMBLY

CROSS-REFERENCE TO RELATED APPLICATIONS

"Not Applicable".

STATEMENT REGARDING FEDERALLY SPONSORED RESEARCH OR DEVELOPMENT

"Not Applicable".

BACKGROUND OF THE INVENTION

This invention relates generally to shutter closures, and more particularly to a power-driven shutter assembly of the type particularly adapted for use on emergency vehicles such as fire trucks and paramedic trucks.

It is conventional to provide external compartments on the sides and rear ends of fire trucks and other emergency vehicles in order to enable ready access to equipment stored in the compartments by workers outside the trucks. Typically, shutters are provided on such compartments to cover the equipment to prevent it from being damaged during transport and to insure against its theft.

A known shutter assembly includes a pair of tracks supported within the opening of a compartment at each side thereof, and a curtain formed of a plurality of rails and having end shoes received in the tracks for guiding bi-directional sliding movement of the curtain between a lowered, closed position and a raised, open position exposing the equipment to the exterior of the truck. An upper end of the curtain is connected to a spring-loaded operator by a pair of straps so that when the curtain is manually raised, the operator assists in the lifting movement, balancing the force required to lift the curtain with that required to lower it.

A feature of the conventional shutter construction is a manually actuated lock for locking the curtain in the closed position so that only authorized personnel can access the compartment. The locking arrangement includes a pair of rods supported in the bottom rail of the curtain for longitudinal shifting movement between extended positions in which the rods extend outward from the curtain into holes in each of the tracks, and retracted positions. A key-actuated lock is also supported on the bottom rail of the curtain and is operable by a key for shifting the rods between the extended and retracted positions to lock and unlock the curtain.

One problem encountered in the use of conventional shutter closures on exterior compartments of emergency vehicles is that it takes time for firemen and paramedics exiting the truck at an emergency site to unlock and lift the shutter curtains in order to gain access to the equipment in the various compartments. As such, conventional closures present a barrier to rapid deployment of the equipment carried by emergency vehicles.

BRIEF SUMMARY OF THE INVENTION

It is an object of the present invention to provide a shutter closure assembly for a fire truck or the like, wherein the closure can be unlocked and opened remotely from the cab of the truck so that emergency personnel are able to more quickly deploy the equipment stored in the compartments than would otherwise be possible.

It is a further object of the invention to provide a power-driven locking arrangement that enables remote locking and unlocking of the closure while permitting manual unlocking in the event that power-driven operation fails.

In accordance with these and other objects evident from the following description of a preferred embodiment of the invention, a power-driven shutter assembly is provided which includes a pair of elongated tracks in which a shutter curtain is received. The shutter curtain is formed by a plurality of rails connected to one another for relative pivotal movement and includes a plurality of end shoes that support the curtain in the tracks for bi-directional sliding movement between an open position and a closed position. A pair of sprockets are supported on the assembly for rotation about an axis extending in a direction perpendicular to the directions of movement of the shutter curtain, and present a plurality of lobes sized to engage the end shoes of the rails to drive the sliding movement of the shutter curtain. A motor drives bi-directional movement of the sprockets, and is connected to a circuit including a switch movable between a first position in which power is supplied to the motor to move the shutter curtain to the open position and a second position in which power is supplied to the motor to move the shutter curtain to the closed position.

A power-driven lock for the shutter assembly includes at least one rod supported on the curtain and being shiftable relative to the curtain between an extended position in which the rod extends outward from the curtain into one of the tracks and a relatively retracted position, and a locking arm supported on one of the tracks and being shiftable between an extended position in which the arm protrudes into the track and a relatively retracted position. A key-actuated lock is supported on the curtain and is operable for shifting the rod between the extended and retracted positions. A power-driven lock is supported on one of the tracks and includes an actuator connected to the locking arm for shifting the arm between the extended and retracted positions. As such, the curtain is locked against sliding movement from the closed position when both the rod and locking arm are extended, and is unlocked for sliding movement from the closed position when either the rod or the locking arm is retracted.

By providing a shutter assembly in accordance with the present invention, numerous advantages are realized. For example, by providing a power drive for opening and closing the curtain of the assembly, it is possible to operate the assembly from the cab of a vehicle on which the assembly is mounted, decreasing the time required for emergency personnel and the like to exit the vehicle and access the corresponding compartment. In addition, by combining the power drive with the powered lock of the present invention, it is possible to lock and unlock the closure from the cab while permitting manual unlocking in the event that power-driven operation fails.

BRIEF DESCRIPTION OF THE SEVERAL VIEWS OF THE DRAWING

The preferred embodiment of the present invention is described in detail below with reference to the attached drawing, wherein:

FIG. 1 is a perspective view of a fire truck having a plurality of external compartments incorporating shutter closure assemblies constructed in accordance with the preferred embodiment of the present invention;

FIG. 2 is an exploded perspective view of the shutter assembly;

FIG. 3 is an exploded fragmentary view of a rail and end shoe forming a part of a curtain of the shutter assembly;

FIG. 4 is an exploded view of a spring-loaded operator forming a part of the shutter assembly;

FIG. 5 is a fragmentary front elevational view of a power drive assembly forming a part of the shutter assembly;

FIG. 7 is a fragmentary sectional view taken along line 7—7 of FIG. 1;

FIG. 8 is a fragmentary front elevational view, partially broken away, of the locking assembly;

FIG. 9 is a fragmentary top plan view, partially broken away, of the locking assembly.

DETAILED DESCRIPTION OF THE INVENTION

Figure 6:
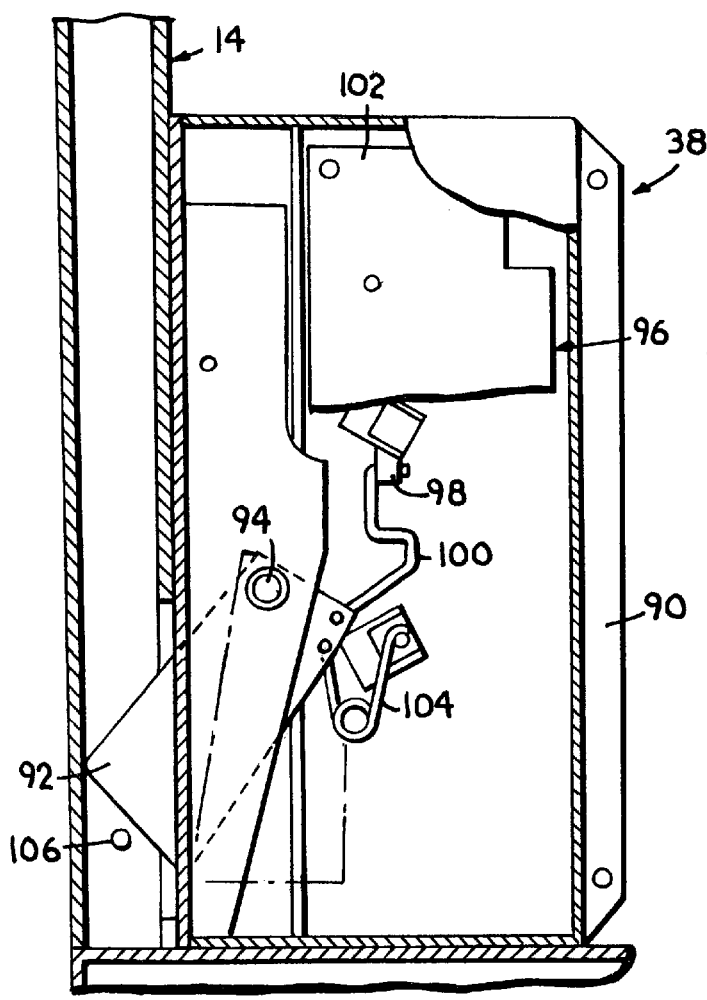
FIG. 6 is a fragmentary perspective view of a locking assembly forming a part of the shutter assembly.

A fire truck having a plurality of external compartments incorporating shutter assemblies constructed in accordance with the preferred embodiment of the present invention is illustrated in FIG. 1. The truck includes a cab 10 within which a driver operates the truck and controls operation of the shutter assemblies, lights, sirens, signals, radios and other control equipment supplied with the vehicle. Preferably, each compartment includes its own shutter assembly 12. However, a single assembly could be provided which spans two or more compartments such that opening of the single shutter assembly would allow access to plural compartments.

With reference to FIG. 2, each shutter assembly broadly includes a pair of tracks 14 mounted inside the opening of one of the compartments, a shutter curtain 16 received in the tracks for bi-directional sliding movement between a raised, open position and a lowered, closed position, and a power drive assembly 18 for driving lifting and lowering of the door in response to an input control signal so that the door can be operated from the cab of the vehicle, if desired. In addition, support structure is provided for supporting the power drive assembly on the vehicle, and an operator 20 is provided for biasing the curtain 16 toward the open position in order to balance the force required to raise and lower the curtain.

The 14 tracks are similar to one another, and each is preferably formed of a single elongated piece of material such as aluminum. With reference to FIG. 9, each track includes front, side and rear walls 22, 24, 26 that together define a channel presenting a rectangular cross-sectional shape and within which the curtain is received for relative sliding movement.

The front wall 22 preferably includes two longitudinally extending strips of material 28, 30 that are connected together along the length of the track by a longitudinally extending web 32. The web separates the space between the two strips 28, 30 into an inboard space and an outboard space. The inboard space is shaped to receive a strip of sealing material 34, shown in FIG. 2, such as a natural or synthetic rubber sealing strip that bears against the curtain during use to seal the space between the curtain and the track. The outboard space defined between the two strips of the front wall is shaped for receipt over an edge 36 of the vehicle lining the compartment opening such that the track can be mounted on the vehicle along the opening and secured in place by threaded fasteners or the like. One or more additional webs of material protrude from the side and rear walls 24, 26 of the track to provide added strength to the construction, and to permit mounting of a power-driven lock 38 on the track, as shown in FIG. 7.

Returning to FIG. 2, the shutter curtain 16 is formed of a plurality of elongated tubular rails 40 that are connected together for relative pivotal movement such that the curtain can be rolled up at the top of the assembly when in the open position. As shown in FIG. 3, each rail 40 presents a generally tubular cross section, including a generally planer outer wall 42 secured to a concave inner wall 44 by upper and lower walls 46, 48. The upper wall 46 is shaped for hinged connection to the lower wall 48 of an adjacent rail, and presents a hook-shaped edge that protrudes from the wall and is turned inward in a first direction. The lower wall 48 presents a hook-shaped edge as well, but the edge of the bottom wall is turned inward in a direction opposite that of the upper edge such that the upper edge of one rail is received in or hooked by the lower edge of an adjacent rail, securing the two rails together while permitting them to pivot relative to one another about an axis parallel to their own longitudinal axes.

Each rail 40 presents opposed open axial ends within which nylon end shoes 50 are received. Each end shoe includes inner and outer portions 52, 54. The inner portion 52 presents a tongue or tab that is sized for slip-fit receipt in one of the open ends of the rails. Preferably, an aperture is formed in the tab which allows the shoe to be secured in place in the end of the rail, e.g. by receiving a threaded fastener or rivet, or by receiving a dimple of rail material which is pressed into the aperture by deforming the rail subsequent to placement of the shoe therein.

The outer portion 54 of the end shoe presents a kidney-bean shape when viewed in side elevation, including a pair of aligned upper lobe elements 56 that extend upward in the final construction of the assembly and a lower lobe element 58 that extends downward. The upper lobe elements are spaced laterally from one another by a distance substantially equal to but slightly greater than the thickness of the lower lobe element so that the lower lobe element of one end shoe is aligned with and received between the pair of upper lobe elements of an adjacent end shoe in the final construction of the curtain. As such, as shown in FIG. 7, the upper lobe elements of each end shoe present a common contour with the lower lobe element 58 of an adjacent rail so that the shoes can be gripped by the power drive assembly to move the curtain in the tracks between the opened and closed positions.

As illustrated in FIG. 2, the support structure of the assembly includes a pair of pennant plates 60 and a motor cradle 62 that facilitate mounting of the power drive assembly in the compartment of the vehicle. The pennant plates are similar to one another, and each includes a plate having apertures which permit the plate to be fastened to the side wall of the vehicle compartment. In addition, each plate includes a generally U-shaped bracket in which the operator 20 is secured. The motor cradle 62 is formed of sheet metal or the like, and is secured to one of the pennant plates in a position in which it supports the motor and gear box assembly. In addition, the cradle provides support to other components of the power drive assembly, as described below.

The operator 20 is shown in FIG. 4, and generally includes a central shaft 64 that is pinned in place in the U-shaped brackets of the pennant plates 60, an outer tubular sleeve 66 supported on the shaft for relative rotation about the shaft, and a torsion spring 68 supported between the shaft and the sleeve, and presenting a first end that is fixed relative to the shaft and a second end that is fixed relative to the rigid sleeve. A spring seat 70 is preferably received on the shaft and secured in place by a set screw or the like. The seat includes a radial opening within which an end of the torsion spring is captured. The second end of the spring is preferably anchored to an end wall of the sleeve 66, and remains fixed to the sleeve during rotation so that the spring 68 twists when the sleeve is rotated.

A pair of straps 72 are secured between the sleeve 66 and the upper rail of the curtain, as shown in FIG. 2, so that when the spring is loaded, the operator exerts a pulling force on the curtain that assists in lifting the curtain to the opened position. It is possible to set this force by pre-winding the spring before fixing the ends thereof to the shaft and sleeve.

The power drive assembly 18 is shown in FIG. 2, and broadly includes a pair of rotatable sprockets 74 shaped to engage the end shoes of the curtain to drive movement of the curtain, a motor 76 connected to the sprockets through a gear box 78 for driving rotation of the sprockets, and an electrical circuit including a control module 80, for controlling operation of the motor. The sprockets 74 are fixed to each end of a shaft that extends in a direction parallel to the axes of the rails of the curtain, and each sprocket presents a toothed outer circumferential surface shaped to engage the lobes presented by the end shoes of the curtain as shown in FIG. 7. In addition, as shown in FIG. 5, each sprocket includes a circular flange 81 disposed inward of the toothed surface and adapted to ride along the inner walls of the curtain rails 40 to guide the curtain as it is raised and lowered by the drive assembly.

The shaft supporting the sprockets 74 is preferably made up of two shaft segments 82, 84. The first segment 82 forms a part of a conventional motor gear box assembly of a type suitable for use in the preferred embodiment of the invention, and is connected to the output shaft of the motor 76 by the gear box 78. The second shaft segment 84 is fixed for rotation with the first segment 82 by a coupling sleeve 86 that is received over the mating ends of the shaft segments, and the free ends of the shafts are supported in bushings provided on the pennant plates 60. The coupling sleeve 86 is secured to both shaft segments by set screws or the like, and ensures that the two sprockets are aligned and rotate with one another. In addition, this construction of the shaft permits the second shaft segment 84 to be shortened during installation, if necessary, so that the shaft fits within the space provided in the vehicle compartment.

The motor 76 and gear box 78 are supported in the motor cradle 62, and remain fixed on the cradle during rotation of the sprocket shaft. The motor is a bi-directional motor, capable of rotating the sprocket shaft in either direction to drive both opening and closing movement of the curtain. As mentioned, the operator 20 balances the load exerted on the motor by the curtain, assisting the motor to lift the curtain during opening.

The electrical circuit that supplies power to the motor includes a source of electricity, preferably the battery of the vehicle, the control module 80, a three position switch, preferably mounted in the cab of the truck, and a sensor 88 for sensing the closed condition of the curtain. The control module 80 is supported on the motor cradle 62, and includes a plurality of input and output leads to which the various components of the power drive assembly are connected in order to form the complete circuit. For example, a first set of wires are connected between the module, the battery of the vehicle, and ground for supplying electricity to the circuit and to the motor. Another pair of wires connect the sensor 88 to the module so that when the sensor senses that the curtain is ajar from its closed position, a signal is supplied to a visual indicator or the like in the cab of the vehicle to warn the person controlling the assembly of the ajar condition.

The switch is also connected to the input leads of the module, and is preferably mounted within easy reach of an operator, enabling the operator to easily and conveniently activate the power drive assembly to raise and lower the door on demand. Preferably, the switch includes a center "off" position, a momentary "open" position, and a momentary "close" position. The motor 76 is connected to the output leads of the module 80 by a set of wires, in which current is supplied in a first direction, driving lifting rotation of the sprockets, and in the opposite direction, driving lowering rotation of the sprockets. As described below, the power-driven lock 38 is also connected to the control module for locking the curtain in the closed position such that an "open" signal from the switch activates both the lock 38 and the drive assembly 18 to unlock the curtain and raise it to the opened position. If desired, a separate switch may alternately be provided that operates only the power-driven lock 38 so that control of the lock is possible independent of the power drive assembly.

Figure 10:
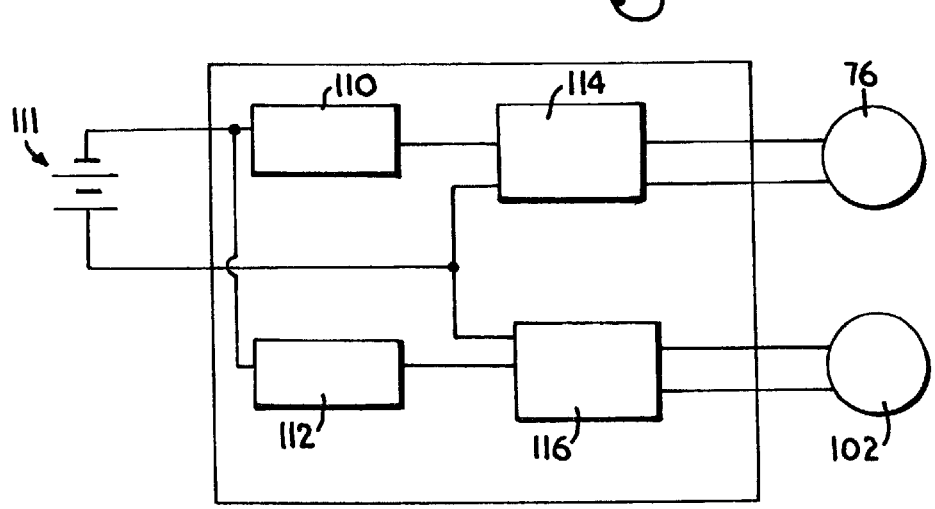
FIG. 10 is a schematic view of various components of the control circuit forming a part of the shutter assembly.

Another feature of the electrical circuit that supplies power to the motor 76 and to the power-driven lock 38 is illustrated schematically in FIG. 10, and resides in the use of current sensing solid state fuses 110, 112 between the source of power 111 and each of the motor 76 and lock 38. These fuses open at preselected current levels, interrupting the supply of power to the motor or lock when the excess current is sensed. With respect to the circuit including the motor 76, the circuit fuse 110 senses an over-current condition when the curtain reaches either of the open or closed positions, or when the curtain closes or opens against an obstruction that prevents complete opening or closing. A current reversing assembly 114, such as one or more relays, is also provided in the circuit for controlling the direction of current to the motor to control the direction of movement of the curtain. An advantage of this construction over one in which limit switches are positioned at the extreme positions of the curtain resides in the ability of the circuit to sense any obstructions that are encountered by the curtain between the fully open or fully closed positions. As such, the motor is not overloaded by such occurrence. In addition, problems are encountered in the use of limit switches in outdoor environments where they have a tendency to become clogged with debris, sometimes rending them useless.

With respect to the lock 38, the current sensing solid state fuse 112 of the electrical circuit senses an over-current condition after a motor of the lock, described below, has shifted the lock from either of the locked or unlocked positions to the opposite position. Once such movement has been completed, opening of the fuse interrupts the supply of power to the lock. Again, this construction eliminates the need for limit switches which are subject to failure in environments such as that in which the shutter assembly of the preferred embodiment is employed.

As shown in FIG. 7, the power-driven lock 38 is disposed adjacent to the lower end of one of the tracks 14, and includes a housing 90 that is secured to the track by threaded fasteners or the like. As illustrated in FIG. 6, the lock also includes a locking arm 92 that is supported in the housing for pivotal movement about a pin 94 between a locking position in which the arm protrudes from the housing, as shown in solid lines in FIG. 6, and an unlocked position in which the arm is retracted relative to the locked position, as shown in broken lines in FIG. 6. As shown in FIG. 8, a slot 96 is formed in the rear wall of the track, and the lock is aligned with the slot so that when the locking arm is extended, it projects into the channel defined by the front, side and rear walls of the track, as shown in FIG. 9.

Returning to FIG. 6, an actuator 96 is supported within the housing and includes an actuator shaft 98 that is connected to the locking arm by a piece of rigid metal wire 100 for pivoting the arm between the extended and retracted positions. The actuator includes a motor 102, and the actuator shaft is either extended or retracted depending on the direction of momentary current through the actuator. In addition, a torsion spring 104 is provided for biasing the locking arm toward whichever position it is moved by the actuator so that the arm is held in the desired position after current to the actuator is interrupted. The torsion spring 104 includes a first end fixed to the housing and a second end fixed to the locking arm such that when the locking arm moves to one position or the other, the longitudinal axis of the spring passes over the center of a line extending between the pivot axis of the locking arm and the end of the spring fixed to the housing. As such the spring exerts a biasing force on the arm toward the position to which it was last moved by the actuator, and ensures that the assembly remains locked in the event of a power outage in the vehicle, protecting the contents of the compartments from theft. As mentioned, upon actuation of the lock 38, the fuse 112, shown in FIG. 10, interrupts current to the motor 102 once the actuator shaft 98 has been moved to one position or the other, and the torsion spring maintains such position of the shaft 98 until power is subsequently supplied to the motor to shift the lock to the opposite position. A current reversing assembly 116, such as one or more relays, is also provided in the electrical circuit for controlling the direction of current to the motor 102 to control the direction of movement of the locking arm.

As shown in FIG. 9, when the locking arm 92 of the power-drive lock is extended, it engages a rod 106 on the curtain to lock the curtain in the closed position and prevent unwanted opening of the compartment. Preferably, the rod protrudes laterally from the bottom rail of the curtain into the space bounded by the track on which the lock is mounted. However, if the rod permanently protruded from the curtain, and power to the lock was lost, it would not be possible to unlock the curtain manually to permit emergency access to the compartment. Thus, the rod 106 is mounted on the curtain in such a way as to permit the rod to be shifted between its extended position protruding into the path of the locking arm and a retracted position in which it does not engage the arm. Preferably, a key-operated actuator 108 is supported on the curtain, as shown in FIG. 2, and is operable for shifting the rod between the extended and retracted positions. The actuator allows shifting of the rod only when a matched key is inserted in the actuator and turned.

By providing this construction of the power-driven lock, the curtain is locked against sliding movement from the closed position when both the rod and locking arm are extended, and is unlocked for sliding movement from the closed position when either the rod or the locking arm is retracted.

If desired, the key-actuator 108 can be connected to a pair of rods through a rotatable plate, wherein each rod protrudes from an opposite end of the bottom rail of the curtain in the extended position. In addition, a separate power driven lock 38 can be attached to each rail so that the locking arm of each lock engages one of the rods in the locked position of the assembly. As such, both sides of the curtain can be locked in the closed position to prevent unauthorized opening of the assembly.

With the shutter assembly installed and the curtain closed, in order to open the curtain an operator sitting in the cab of the vehicle simply moves the switch momentarily to the "open" position, triggering a control signal to be supplied by the control module 80 to the actuator of the lock 38, retracting the locking arm, as shown in FIG. 6, to allow opening movement of the curtain. At the same time, or shortly thereafter, current is supplied to the motor in a first direction, rotating the sprockets 74 in the raising direction, e.g. clockwise in FIG. 7. As the sprockets rotate, the teeth thereon engage the lobes presented by the end shoes 50 of the curtain, sliding the curtain open with the assistance of the spring force exerted on the curtain by the operator 20. Thereafter, the compartment is accessible, and it is possible for emergency personnel to exit the vehicle and immediately access the compartment without having to manually open the curtain.

In order to close the curtain, the operator in the cab simply moves the switch momentarily to the "close" position, triggering current to be supplied to the motor in the second direction, rotating the sprockets in the lowering direction. As the sprockets 74 rotate, e.g. in the counter clockwise direction in FIG. 7, the teeth thereon engage the lobes presented by the end shoes of the curtain, sliding the curtain closed against the spring force of the operator. Thereafter, a momentary signal is supplied to the actuator of the lock 38, shifting the locking arm to the extended position so that it engages the rod, preventing opening of the curtain. As shown in FIG. 2, the sensor 88 includes a first element supported on the motor cradle and a second element secured to the curtain at a position that is aligned with the first element in the closed position of the curtain. As such, the sensor detects the alignment of the two elements, and provides a signal to the control module in the event that the curtain is ajar. This signal can be used simply to provide an indication of the condition, or can provide a signal to supply power to compartment lights of the vehicle.

If power is lost to the assembly, it is still possible to access the compartment by manually shifting the rod 106 to the retracted position and lifting the curtain open. This lifting motion is aided by the operator 20. Likewise, the curtain can be manually lowered and locked so long as the locking arm of the lock remains in the extended position.

Although the invention has been described with reference to the preferred embodiment illustrated in the attached drawing figures, it is noted that substitutions may be made and equivalents employed herein without departing from the scope of the invention as recited in the claims.

We claim:

1. A power-driven shutter assembly comprising:

a pair of elongated tracks;

a shutter curtain supported in the tracks for bi-directional sliding movement between open and closed positions, the curtain being formed by a plurality of rails that are connected to one another for relative pivotal movement and including a plurality of end shoes supported on the rails;

a pair of sprockets supported on the assembly for rotation and presenting teeth that are sized to engage the end shoes of the rails to drive sliding movement of the shutter curtain relative to the tracks;

an operator connected to the curtain for biasing the curtain toward the open position to generally balance the force required to open the shutter curtain relative to the force required to close the shutter curtain;

a motor connected to the sprockets for driving rotation of the sprockets; and a control circuit for supplying power to the motor to move the shutter curtain between the open and closed positions, wherein each rail of the curtain includes opposing open axial ends, and each end shoe includes a first end received in respective open axial ends of the rails and an opposing second end presenting at least one lobe shaped for receipt of the teeth of one of the sprockets.

2. A shutter assembly as recited in claim 1, further comprising a shaft supported for rotation about an axis extending in a direction perpendicular to the direction of sliding movement of the curtain, the sprockets being fixed to the shaft.

3. A shutter assembly as recited in claim 2, further comprising a gearbox connected between the motor and the sprocket for transmitting drive from the motor to the shaft.

4. A shutter assembly as recited in claim 1, wherein the control circuit includes a sensor for detecting when the curtain is closed and an indicator for indicating the status of the sensor.

5. A power-driven shutter assembly comprising:

a pair of elongated tracks;

a shutter curtain supported in the tracks for bi-directional sliding movement between open and closed positions, the curtain being formed by a plurality of rails that are connected to one another for relative pivotal movement and including a plurality of end shoes supported on the rails;

a pair of sprockets supported on the assembly for rotation and presenting teeth that are sized to engage the end shoes of the rails to drive sliding movement of the shutter curtain relative to the tracks;

a motor connected to the sprockets for driving rotation of the sprockets;

a control circuit for supplying power to the motor to move the shutter curtain between the open and closed positions;

at least one rod supported on the curtain and being shiftable between an extended position in which the rod extends outward from the curtain into one of the tracks and a relatively retracted position;

a first actuator supported on the curtain for shifting the rod between the extended and retracted positions;

a locking arm supported on one of the tracks and being shiftable between an extended position in which the arm protrudes into the track and a relatively retracted position; and a second actuator connected to the arm for shifting the arm between the extended and retracted positions, the curtain being locked against sliding movement from the closed position when both the rod and locking arm are extended, and being unlocked for sliding movement from the closed position when at least one of the rod and the locking arm is retracted.

6. A shutter assembly as recited in claim 5, wherein the control circuit includes a current sensing solid state fuse that opens in response to an increased current through the second actuator such that power to the second actuator is interrupted once the locking arm has reached one of the extended and retracted positions.

7. A shutter assembly as recited in claim 5, wherein the first actuator is a mechanical key-entry actuator.

8. A shutter assembly as recited in claim 5, wherein the second actuator includes a motor.

9. A shutter assembly as recited in claim 5, further comprising spring that biases the locking arm toward whichever position to which it is moved by the power-driven actuator.

10. A shutter assembly as recited in claim 5, wherein the control circuit includes a current sensing solid state fuse that opens in response to an increased current through the second actuator such that power to the second actuator is interrupted once the locking arm has reached one of the extended and retracted positions.

* * * * *